United States Patent
Zhu

(10) Patent No.: US 11,494,594 B2
(45) Date of Patent: Nov. 8, 2022

(54) METHOD FOR TRAINING MODEL AND INFORMATION RECOMMENDATION SYSTEM

(71) Applicant: Guangdong Oppo Mobile Telecommunications Corp., Ltd., Guangdong (CN)

(72) Inventor: Taipeng Zhu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1046 days.

(21) Appl. No.: 16/173,469

(22) Filed: Oct. 29, 2018

(65) Prior Publication Data
US 2019/0205704 A1 Jul. 4, 2019

(30) Foreign Application Priority Data

Dec. 29, 2017 (CN) .......................... 201711476205.7

(51) Int. Cl.
*G06K 9/62* (2022.01)
*G06Q 30/02* (2012.01)
*G06N 20/00* (2019.01)

(52) U.S. Cl.
CPC ........... *G06K 9/6267* (2013.01); *G06K 9/623* (2013.01); *G06K 9/6256* (2013.01); *G06N 20/00* (2019.01);
(Continued)

(58) Field of Classification Search
CPC .... G06K 9/6267; G06K 9/623; G06K 9/6256; G06N 20/00; G06Q 30/02; G06Q 30/0269; G06Q 30/0277; G06Q 30/0282
See application file for complete search history.

(56) References Cited

U.S. PATENT DOCUMENTS
2016/0371589 A1 12/2016 Golbandi et al.

FOREIGN PATENT DOCUMENTS

| CN | 102968446 A | 3/2013 |
|---|---|---|
| CN | 105683944 A | 6/2016 |

(Continued)

OTHER PUBLICATIONS

Wang, Linlin, et al. "Relation classification via multi-level attention cnns." Proceedings of the 54th Annual Meeting of the Association for Computational Linguistics (vol. 1: Long Papers). 2016. (Year: 2016).*

(Continued)

*Primary Examiner* — Eric Nilsson
(74) *Attorney, Agent, or Firm* — Young Basile Hanlon & MacFarlane, P.C.

(57) ABSTRACT

A method for training a model and an information recommendation system are provided. The method includes the following. Multiple types of features of the target model are obtained and a feature group sequence of the multiple types of features is generated, where the feature group sequence includes multiple feature groups and a sequence relation between the multiple feature groups and each feature group contains at least one type of features among the multiple types of features. The target model is classified into a multi-level model according to the feature group sequence. A trained target model is obtained by executing a preset training operation on the feature weight values corresponding to each level of the multi-level model.

17 Claims, 5 Drawing Sheets

(52) U.S. Cl.
CPC ......... *G06Q 30/02* (2013.01); *G06Q 30/0269* (2013.01); *G06Q 30/0277* (2013.01); *G06Q 30/0282* (2013.01)

(56) References Cited

FOREIGN PATENT DOCUMENTS

| | | | |
|---|---|---|---|
| CN | 106649686 | A | 5/2017 |
| CN | 107180375 | A | 9/2017 |
| CN | 108062573 | A | 5/2018 |
| EP | 3021264 | A1 | 5/2016 |
| EP | 3139288 | A1 | 3/2017 |

OTHER PUBLICATIONS

Zhang, Yongfeng, et al. "Explicit factor models for explainable recommendation based on phrase-level sentiment analysis." Proceedings of the 37th international ACM SIGIR conference on Research & development in information retrieval. 2014. (Year: 2014).*

Macías, Fernando, Esther Guerra, and Juan de Lara. "Towards rearchitecting meta-models into multi-level models." International Conference on Conceptual Modeling. Springer, Cham, 2017. (Year: 2017).*

Indian Examination Report for IN Application 201814040910 dated Apr. 30, 2021. (7 pages).

European Examination Report for EP Application 18204385.1 dated Feb. 3, 2021. (8 pages).

Extended European search report issued in corresponding European application No. 18204385.1 dated Feb. 27, 2019.

International search report issued in corresponding international application No. PCT/CN2018/111874 dated Jan. 25, 2019.

Summons to attend oral proceedings pursuant to Rule 115(1) EPC for EP Application 18204385.1 mailed Mar. 11, 2022. (11 pages).

* cited by examiner

METHOD FOR TRAINING MODEL AND INFORMATION RECOMMENDATION SYSTEM

CROSS-REFERENCE TO RELATED APPLICATION(S)

This application claims priority to Chinese Patent Application No. 201711476205.7, filed on Dec. 29, 2017, the content of which is hereby incorporated by reference in its entirety.

TECHNICAL FIELD

This disclosure relates to the technical fields of machine learning, and more particularly to a method for training a model and an information recommendation system.

BACKGROUND

At present, some personalized recommendation models on the market are realized based on a machine learning method such as a logistic regression (LR) or a RANKLR. A machine learning model can be trained through user's previous behaviors (such as clicking, browsing, purchasing, commenting and the like) in a system. A trained model can be configured to estimate a relevance score or a click-through-rate (CTR) between the user and an item to be recommended. Thereafter, personalized recommendation for the user with selected items can be achieved according to the relevance score or the CTR.

SUMMARY

A method for training a model and an information recommendation system are provided.

According to a first aspect of the implementations of the disclosure, a method for training a model is provided. The method is applicable to an information recommendation system and the information recommendation system includes a target model. The method includes the follows. Multiple types of features of the target model are obtained. A feature group sequence of the multiple types of features is generated, where the feature group sequence includes multiple feature groups and a sequence relation between the multiple feature groups, and each feature group contains at least one type of features among the multiple types of features. The target model is classified into a multi-level model according to the feature group sequence, where feature weight values corresponding to each level of the multi-level model match with features in a feature group at a corresponding position of the feature group sequence. A trained target model is obtained by executing a preset training operation on the feature weight values corresponding to each level of the multi-level model, where one or more levels of the trained target model are configured to estimate a recommendation result of a target recommendation task.

According to a second aspect of the implementations of the disclosure, an information recommendation system is provided. The information recommendation system includes a processor and a memory. The memory is configured to store executable program codes which, when executed, cause the processor to: obtain multiple types of features of the target model; generate a feature group sequence of the multiple types of features, where the feature group sequence includes multiple feature groups and a sequence relation between the multiple feature groups, and each feature group contains at least one type of features among the multiple types of features; classify the target model into a multi-level model according to the feature group sequence, where feature weight values corresponding to each level of the multi-level model match with features in a feature group at a corresponding position of the feature group sequence; obtain a trained target model by executing a preset training operation on the feature weight values corresponding to each level of the multi-level model, where one or more levels of the trained target model are configured to estimate a recommendation result of a target recommendation task.

According to a third aspect of the disclosure, a method for training a model is provided. The method is applicable to an information recommendation system, the information recommendation system includes a first system, and the first system includes a target model. The method includes the following. The first system obtains multiple types of features of the target model. The first system generates a feature group sequence of the multiple types of features, where the feature group sequence includes multiple feature groups and a sequence relation between the multiple feature groups and each feature group contains at least one type of features among the multiple types of features. The first system classifies the target model into a multi-level model according to the feature group sequence, where feature weight values corresponding to each level of the multi-level model match with features in a feature group at a corresponding position of the feature group sequence. The first system obtains a trained target model by executing a preset training operation on the feature weight values corresponding to each level of the multi-level model, where one or more levels of the trained target model are configured to estimate a recommendation result of a target recommendation task.

BRIEF DESCRIPTION OF THE DRAWINGS

The following briefly introduces the accompanying drawings involved in the implementations of the disclosure.

DETAILED DESCRIPTION

Hereinafter, technical solutions embodied in implementations of the disclosure will be described in a clear and comprehensive manner in conjunction with the accompanying drawings. It is evident that the implementations described herein are merely some rather than all of the implementations of the disclosure. Those of ordinary skill in the art will be able to derive other implementations based on these implementations without creative work, and all such derived implementations shall fall in the protection scope of the disclosure.

The terms "first" and "second" used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally further include other steps or units that are not listed; alternatively, other steps or units inherent to the process, method, product, or device can be included either.

The term "embodiment" or "implementation" referred to herein means that a particular feature, structure, or characteristic described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

Figure 1A:
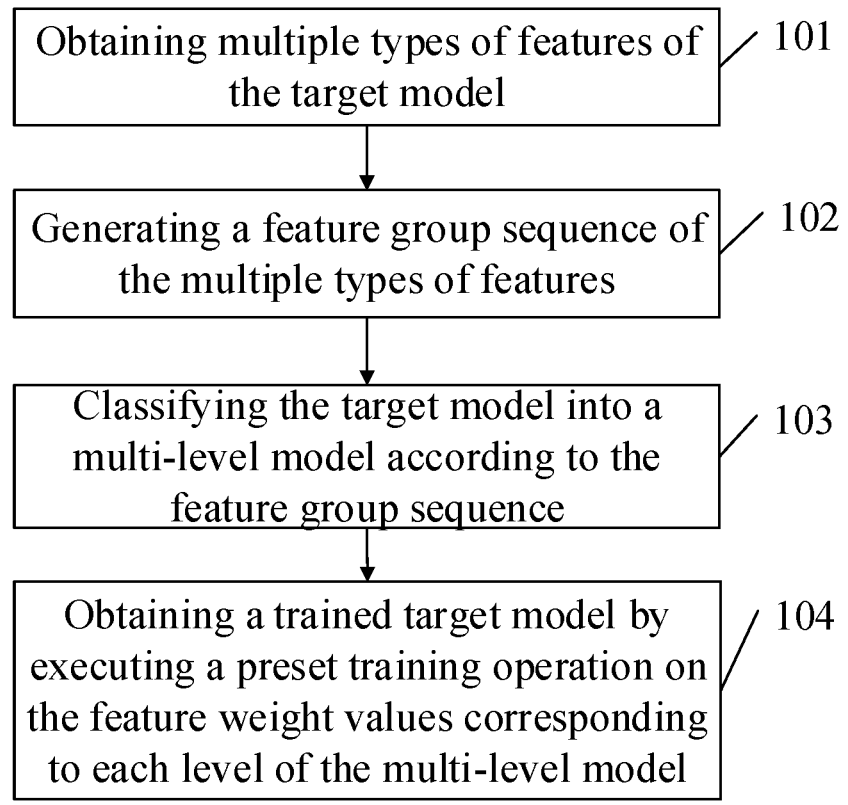
FIG. 1A is a schematic flow chart illustrating a method for training a model according to an implementation of the present disclosure.

FIG. 1A is a schematic flow chart illustrating a method for training a model according to an implementation of the present disclosure. The method is applicable to an information recommendation system. The information recommendation system includes a target model. As illustrated in FIG. 1A, the method begins with operations at block 101.

At block 101, multiple types of features of the target model are obtained.

At block 102, a feature group sequence of the multiple types of features is generated, where the feature group sequence includes multiple feature groups and a sequence relation between the multiple feature groups and each feature group contains at least one type of features among the multiple types of features.

At block 103, the target model is classified into a multi-level model according to the feature group sequence, where feature weight values corresponding to each level of the multi-level model match with features in a feature group at a corresponding position of the feature group sequence.

At block 104, a trained target model is obtained by executing a preset training operation on the feature weight values corresponding to each level of the multi-level model, where one or more levels of the trained target model are configured to estimate a recommendation result of a target recommendation task.

In one implementation, the target model is configured to execute a recommendation task for items to be recommended, and types of features of the target model include at least one of: features of attribute of the items to be recommended, features of a target user, and features of a scenario in which the target user is located.

In one implementation, the feature group sequence of the multiple types of features is generated as follows. The multiple types of features are classified into multiple feature groups according to a type classification strategy, where each feature group contains at least one feature of the same type, a sequence relation is constructed between the multiple feature groups in descending order of the number of features in each feature group, and the feature group sequence of the multiple types of features is formed according to the sequence relation.

In one implementation, the feature group sequence of the multiple types of features is generated as follows. Stability of each type of features of the multiple types of features is determined, and the feature group sequence is generated according to the stability of each type of features of the multiple types of features.

In one implementation, the stability of each type of features of the multiple types of features is determined as follows. A first feature weight value of each type of features is obtained by training the target model via first sample data, a second feature weight value of each type of features is obtained by training the target model via second sample data, a difference in feature weight values of each type of features is determined according to the first feature weight value and the second feature weight value, a ratio of sample data with partially missing features, from among the first sample data and the second sample data is determined, and the stability of each type of features is determined according to the ratio and the difference.

The feature weight values corresponding to each level of the multi-level model match with features in a feature group at a corresponding position of the feature group sequence when feature groups in the feature group sequence are sorted in a descending order of stability.

The preset training operation includes: keeping feature weight values corresponding to levels other than a current level in the multi-level model unchanged and training feature weight values corresponding to the current level according to preset sample data.

In one implementation, the method further includes the follows after the obtaining a trained target model by executing a preset training operation on the feature weight values corresponding to each level of the multi-level model. The target recommendation task is executed.

It should be noted that, the method for training a model illustrated in FIG. 1A is applicable to an information recommendation system. As an implementation, the information recommendation system includes a first system and a second system, where the first system can be cloud computing resources or a server cluster and the second system can be a server cluster. Operations of the method for training a model illustrated in FIG. 1A can be conducted by at least one of: the first system, the second system, and the system and the second system, which is not limited herein.

Figure 1B:
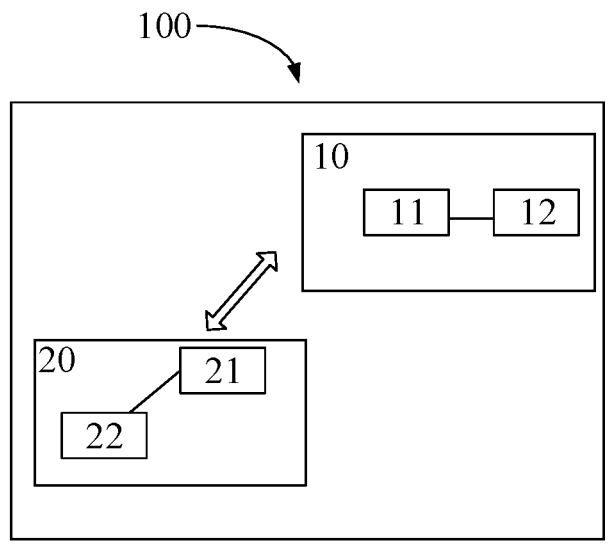
FIG. 1B is a system architecture of an information recommendation system according to an implementation of the present disclosure.

FIG. 1B is a system architecture of an information recommendation system 100 according to an implementation of the present disclosure. The information recommendation system 100 may take the physical form of a server cluster and/or cloud computing resources, which is not limited herein. The information recommendation system 100 can include a first system 20, where the first system 20 can be a server cluster. The first system 20 includes a training database 21 and a to-be-trained target model 22. The first system 20 is configured to periodically train the to-be-trained target model 22 by using training data in the training database 21, to obtain a trained target model 11. In an implementation, the information recommendation system 100 can further include a second system 10. The second system 10 can be cloud computing resources or a server cluster. The second system 10 includes the trained target model 11 and a predictor 12. The trained target model 11 is configured to process a real-time online recommendation task. The predictor 12 is configured to generate an estimated prior result in conjunction with the trained target model 11 and reference feature data associated with the recommendation task to be processed. The first system 20 is further configured to push the trained target model 11 to the second system 10 for use. It is to be understood that, "estimated prior result" refers to a description of what is likely to happen in the future based on the information that you have now and the goal thereof is often most useful to generate a range of possible results that is precise enough to be useful even if input data may be incomplete, uncertain, or unstable. In one implementation, the estimated prior result can be a result produced depending on the predictor, the feature parameters, and the target model.

In general design, personalized recommendation models based on a logistic regression (LR) or a RANKLR are usually training all features of the model at one time. However, for a situation that items to be recommended are often changed, the recommendation effect of the model having the general design is not ideal. For example, in news recommendation, there have new news to be recommended every moment. When calculating sorting scores of new items, large deviations in the scores of new items will occur caused by missing features, which will affect the accuracy of recommendation. Furthermore, for a recommendation system, a large loss of revenue will be generated.

As an implementation, the first system 20 can refer to an offline system and the second system 10 can refer to an online system.

In view of the above, implementations of the present disclosure provide a method for training a model. The method includes the following operations. A first system obtains multiple types of features of the target model. The first system generates a feature group sequence of the multiple types of features. The first system classifies the target model into a multi-level model according to the feature group sequence. Thereafter, the first system obtains a trained target model by executing a preset training operation on the feature weight values corresponding to each level of the multi-level model, where one or more levels of the trained target model are configured to estimate a recommendation result of a target recommendation task. The target recommendation task is a recommendation task for one or more target items to be recommended. Since the feature group sequence includes multiple feature groups and a sequence relation between the multiple feature groups, each feature group contains at least one type of features among the multiple types of features, and feature weight values corresponding to each level of the multi-level model match with features in a feature group at a corresponding position of the feature group sequence, the target model can adapt a corresponding model level according to features of a recommendation task with missing features when executing the recommendation task, and further the model level adapted can be used to execute the recommendation task with missing features to obtain a more accurate recommendation result, thus reducing a deviation of the recommendation result of the recommendation task caused by the missing features, which can be beneficial to improve comprehensiveness and accuracy of the target model executing the recommendation task.

The following describes the implementations of the present disclosure with reference to the accompanying drawings.

Figure 2:
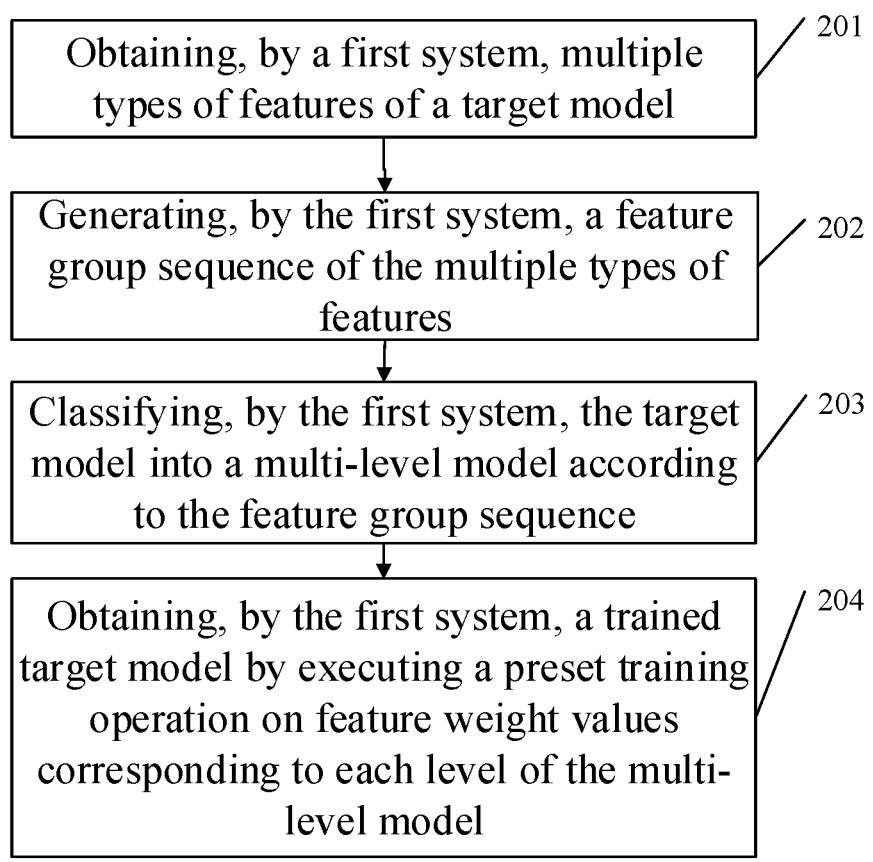
FIG. 2 is a schematic flow chart illustrating a method for training a model according to an implementation of the present disclosure.

Referring to FIG. 2, FIG. 2 is a schematic flow chart illustrating a method for training a model according to an implementation of the present disclosure. The method is applicable to an information recommendation system. The information recommendation system includes a first system. As illustrated in FIG. 2, the method begins with operations at block 201.

At block 201, the first system obtains multiple types of features of the target model.

The target model refers to a model, in the information recommendation system, configured to execute a recommendation task for items to be recommended. The target model can be implemented according to a machine learning method such as a logistic regression (LR) or a RANKLR. Features of the target model include features of attribute of the items to be recommended, features of a target user himself, features of a scenario in which the target user is located, and the like.

The following describes a news recommendation model in a news recommendation new system as an example of the target model. Features of the news recommendation model includes features (such as an icon of the news) of the news itself (in other words, the features of attribute of the items to be recommended), features (such as gender, age, preference) of a user reading the news (in other words, the features of a target user himself), and a current scenario (including various predefined scenarios such as travel, home, and the like) where the user reading the news is located (in other words, the features of a scenario in which the target user is located).

At block 202, the first system generates a feature group sequence of the multiple types of features. The feature group sequence includes multiple feature groups and a sequence relation between the multiple feature groups. Each feature group contains at least one type of features among the multiple types of features.

In this implementation, each feature group contains at least one feature of the same type.

It will be understand that the feature group sequence of the multiple types of features can be generated by the first system in various manners, which are not limited herein.

In one implementation, the first system generates the feature group sequence of the multiple types of features as follows. The first system classifies the multiple types of features into the plurality of feature groups according to a type classification strategy. Each feature group contains at least one feature of the same type. A sequence relation between the multiple feature groups can be constructed in descending order of the number of features in each feature group, and therefore the feature group sequence of the multiple types of features can be formed according to the sequence relation.

For example, continue taking the news recommendation model in the news recommendation new system as an example of the target model. The first system can classify the multiple types of features into three feature groups according to the features of the target model. The first feature group includes features of the news itself, the second feature group includes features of a user reading the news, and the third feature group includes a current scenario (scenarios) where the user reading the news is located. Specifically, the first feature group can include an icon of the news, news quality, and news authors; the second feature group can include gender and age of the user reading the news; the third feature group can include travel. Then a feature group sequence can be generated as follows: [the icon of the news, the news quality, and the news authors]→[gender and age of the user reading the news]→[travel].

In another implementation, generating the feature group sequence of the multiple types of features can also be implemented by the first system in following manners. The first system determines stability of each type of features of the multiple types of features. The first system generates the feature group sequence according to the stability of each type of features of the multiple types of features.

In one implementation, each feature group contains at least one feature of the same type, and the first system generates the feature group sequence in descending order of stability of each type of features.

For example, in the news recommendation system, a relation between user's preference for news types and a recommendation result of the news recommendation model (such as sorting score), a relation between gender/age of the user reading the news and the recommendation result of the news recommendation model are usually more stable, news authors, news quality, and news popularity are relatively stable, and the current scenario "travel" is the most unstable. In descending order of the stability, a feature group sequence can be generated as follows: [the user's preference for news types, the gender, and the age]→[the news authors, the news quality, and the news popularity]→[travel]. Features in each feature group belong to the same type and features in each feature group correspond to a feature weight value. In this way, training features can be formed in a layered training method, and feature weight values of features with better stability are first trained, so that the news recommendation model can still obtain a reliable sorting score in case of a recommendation task with some missing features.

In one implementation, the first system determines the stability of each type of features of the multiple types of features as follows. The first system obtains a first feature weight value of each type of features by training the target model via first sample data. The first system obtains a second feature weight value of each type of features by training the target model via second sample data. The first system determines a difference in feature weight values of each type of features according to the first feature weight value and the second feature weight value. The first system determines a ratio of sample data with partially missing features, from among the first sample data and the second sample data. The first system determines the stability of each type of features according to the ratio and the difference.

In one implementation, the sample data with partially missing features refers to sample data with partially missing features of a type. For example, features of the user reading the news are missing.

The first system may conduct a weight-average operation on the ratio and the difference, to obtain the stability of each type of features. The stability of each type of features can also be calculated according to other preset calculation strategies, which are not limited herein.

A variation range of feature weight values can reflect the stability of the feature to some extent, so that combining with impact of the sample data with partially missing features to the stability of the model, the first system can analyze the stability of the features from the whole and feature individuals, which can improve the accuracy of the determined stability.

At block 203, the first system classifies the target model into a multi-level model according to the feature group sequence, where feature weight values corresponding to each level of the multi-level model match with features in a feature group at a corresponding position of the feature group sequence.

In one implementation, the feature weight values corresponding to each level of the multi-level model match with features in a feature group at a corresponding position of the feature group sequence when feature groups in the feature group sequence are sorted in a descending order of stability.

At block 204, the first system obtains a trained target model by executing a preset training operation on the feature weight values corresponding to each level of the multi-level model, where one or more levels of the trained target model are configured to estimate a recommendation result of a target recommendation task.

A training order of the levels in the multi-level model is matched with an order that the feature groups in the feature group sequence are sorted in a descending order of stability.

In one implementation, the trained target model can determine a target level for estimating a recommendation result according to features of a current target recommendation task when executing the target recommendation task. The target level may be a progressive level. For example, when the target model has 5 levels, the target level may include a first level, or the first level and a second level, or the first level, the second level, and a third level, or the first level, the second level, the third level, and a fourth level, or the first level, the second level, the third level, the fourth level, and a fifth level.

According to the implementations of the disclosure, the first system obtains the multiple types of features of the target model and generates the feature group sequence of the multiple types of features. The first system classifies the target model into the multi-level model according to the feature group sequence. Thereafter, the first system obtains the trained target model by executing the preset training operation on the feature weight values corresponding to each level of the multi-level model, where one or more levels of the trained target model are configured to estimate the recommendation result of the target recommendation task. The feature group sequence includes the multiple feature groups and the sequence relation between the multiple feature groups, each feature group contains at least one type of features among the multiple types of features, and feature weight values corresponding to each level of the multi-level model match with features in a feature group at a corresponding position of the feature group sequence, so that the target model can adapt a corresponding model level according to features of a recommendation task with missing features when executing the recommendation task, and the model level adapted can be used to execute the recommendation task to obtain a more accurate recommendation result, thus reducing a deviation of the recommendation result of the recommendation task caused by the missing features, which can be beneficial to improve comprehensiveness and accuracy of the target model executing the recommendation task.

In one implementation, the preset training operation includes the following. Feature weight values corresponding to levels other than a current level in the multi-level model are kept unchanged. Feature weight values corresponding to the current level can be trained according to preset sample data.

Specific strategies for training feature weight values include a gradient descent method, a quasi-newton method and the like, which are not limited herein.

In one implementation, when the first system trains feature weight values corresponding to each level, by keeping the feature weight values corresponding to the levels other than the current level in the multi-level model unchanged, the effect of the feature weight values corresponding to the levels other than the current level in the multi-level model on the target model can be reduced, and the feature weight values corresponding to the current level can be accurately calculated, which can improve the accuracy of the feature weight values calculated.

In one implementation, the information recommendation system further includes a second system. Based on such configuration, the method further includes the following after the first system obtains the trained target model by executing the preset training operation on the feature weight values corresponding to each level of the multi-level model. The first system sends the trained target model to the second system and the trained target model is configured for the second system to execute the target recommendation task.

The first system can regularly train the target model by using sample data and can push the trained target model to the second system in time. The second system executes a recommendation task for items to be recommended in real time, where the items to be recommended may include advertisement, news, and other information.

As can be seen, after obtaining the trained target model, the first system can promptly push the trained target model to the second system, thereby improving maintenance synchronization and flexibility of the system.

Figure 3:
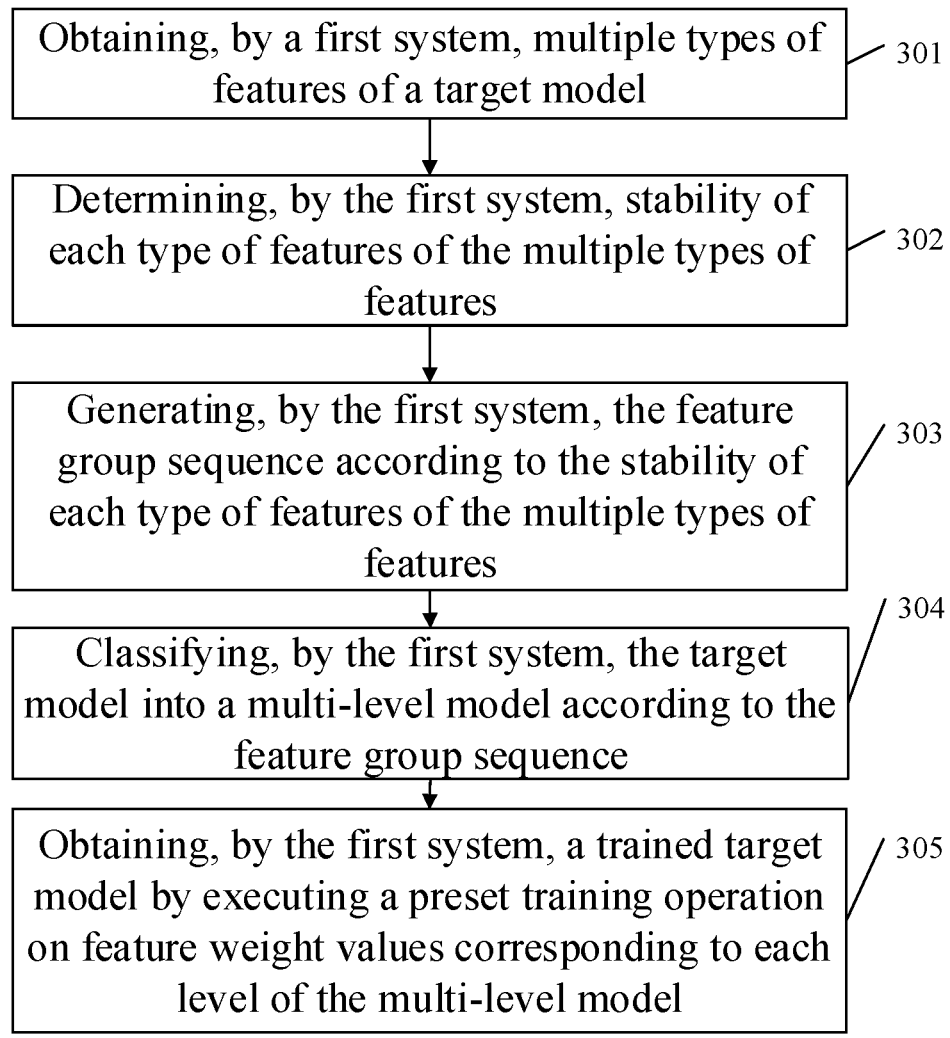
FIG. 3 is a schematic flow chart illustrating a method for training a model according to an implementation of the present disclosure.

Consistent with the implementations illustrated in FIG. 2, FIG. 3 is a schematic flow chart illustrating a method for training a model according to an implementation of the present disclosure. The method is applicable to an information recommendation system. The information recommendation system includes a first system. The first system includes a target model. As illustrated in FIG. 3, the method begins with operations at block 301.

At block 301, the first system obtains multiple types of features of the target model.

At block 302, the first system determines stability of each type of features of the multiple types of features.

At block 303, the first system generates a feature group sequence according to the stability of each type of features of the multiple types of features, where the feature group sequence includes multiple feature groups and a sequence relation between the multiple feature groups and each feature group contains at least one type of features among the multiple types of features.

At block 304, the first system classifies the target model into a multi-level model according to the feature group sequence, where feature weight values corresponding to each level of the multi-level model match with features in a feature group at a corresponding position of the feature group sequence.

At block 305, the first system obtains a trained target model by executing a preset training operation on the feature weight values corresponding to each level of the multi-level model, where one or more levels of the trained target model are configured to estimate a recommendation result of a target recommendation task.

According to the implementations of the disclosure, the first system obtains the multiple types of features of the target model and generates the feature group sequence of the multiple types of features. The first system classifies the target model into the multi-level model according to the feature group sequence. Thereafter, the first system obtains the trained target model by executing the preset training operation on the feature weight values corresponding to each level of the multi-level model, where one or more levels of the trained target model are configured to estimate the recommendation result of the target recommendation task. The feature group sequence includes the multiple feature groups and the sequence relation between the multiple feature groups, each feature group contains at least one type of features among the multiple types of features, and feature weight values corresponding to each level of the multi-level model match with features in a feature group at a corresponding position of the feature group sequence, so that the target model can adapt a corresponding model level according to features of a recommendation task with missing features when executing the recommendation task, and the model level adapted can be used to execute the recommendation task to obtain a more accurate recommendation result, thus reducing a deviation of the recommendation result of the recommendation task caused by the missing features, which can be beneficial to improve comprehensiveness and accuracy of the target model executing the recommendation task.

In addition, training features can be formed in a layered training method, and feature weight values of features with better stability are first trained, so that the news recommendation model can still obtain a reliable recommendation result in case of a recommendation task with some missing features.

Figure 4:
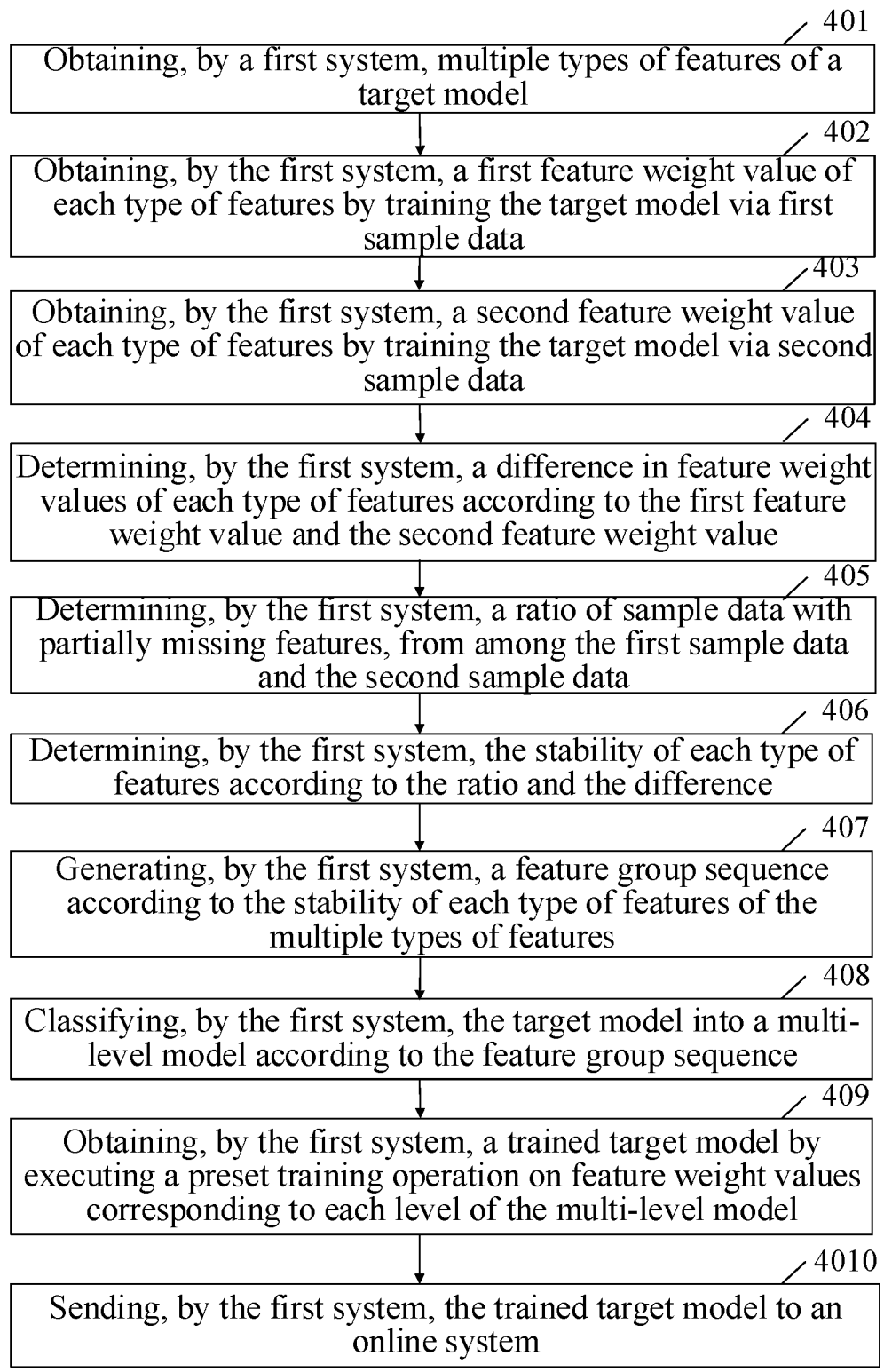
FIG. 4 is a schematic flow chart illustrating a method for training a model according to an implementation of the present disclosure.

Consistent with the implementations illustrated in FIG. 2, FIG. 4 is a schematic flow chart illustrating a method for training a model according to an implementation of the present disclosure. The method is applicable to an information recommendation system. The information recommendation system includes a first system. The first system includes a target model. The information recommendation system further includes a second system. As illustrated in FIG. 4, the method begins with operations at block 401.

At block 401, the first system obtains multiple types of features of the target model.

At block 402, the first system obtains a first feature weight value of each type of features by training the target model via first sample data.

At block 403, the first system obtains a second feature weight value of each type of features by training the target model via second sample data.

At block 404, the first system determines a difference in feature weight values of each type of features according to the first feature weight value and the second feature weight value.

At block 405, the first system determines a ratio of sample data with partially missing features, from among the first sample data and the second sample data.

At block 406, the first system determines the stability of each type of features according to the ratio and the difference.

At block 407, the first system generates a feature group sequence according to the stability of each type of features of the multiple types of features, where the feature group sequence includes multiple feature groups and a sequence relation between the multiple feature groups and each feature group contains at least one type of features among the multiple types of features.

At block 408, the first system classifies the target model into a multi-level model according to the feature group sequence, where feature weight values corresponding to each level of the multi-level model match with features in a feature group at a corresponding position of the feature group sequence.

At block 409, the first system obtains a trained target model by executing a preset training operation on the feature weight values corresponding to each level of the multi-level model, where one or more levels of the trained target model are configured to estimate a recommendation result of a target recommendation task. The preset training operation includes the following. Feature weight values corresponding to levels other than a current level in the multi-level model are kept unchanged. Feature weight values corresponding to the current level are trained according to preset sample data.

At block 4010, the first system sends the trained target model to the second system, where the trained target model is configured for the second system to execute the target recommendation task.

According to the implementations of the disclosure, the first system obtains the multiple types of features of the target model and generates the feature group sequence of the multiple types of features. The first system classifies the target model into the multi-level model according to the feature group sequence. Thereafter, the first system obtains the trained target model by executing the preset training operation on the feature weight values corresponding to each level of the multi-level model, where one or more levels of the trained target model are configured to estimate the recommendation result of the target recommendation task. The feature group sequence includes the multiple feature groups and the sequence relation between the multiple feature groups, each feature group contains at least one type of features among the multiple types of features, and feature weight values corresponding to each level of the multi-level model match with features in a feature group at a corresponding position of the feature group sequence, so that the target model can adapt a corresponding model level according to features of a recommendation task with missing features when executing the recommendation task, and the model level adapted can be used to execute the recommendation task to obtain a more accurate recommendation result, thus reducing a deviation of the recommendation result of the recommendation task caused by the missing features, which can be beneficial to improve comprehensiveness and accuracy of the target model executing the recommendation task.

In addition, training features can be formed in a layered training method, and feature weight values of features with better stability are first trained, so that the news recommendation model can still obtain a reliable recommendation result in case of a recommendation task with some missing features.

Since a variation range of feature weight values can reflect the stability of the feature to some extent, so that combining with impact of the sample data with partially missing features to the stability of the model, the first system can analyze the stability of the features from the whole and feature individuals, which can improve the accuracy of the determined stability.

In one implementation, when the first system trains feature weight values corresponding to each level, by keeping the feature weight values corresponding to the levels other than the current level in the multi-level model unchanged, the effect of the feature weight values corresponding to the levels other than the current level in the multi-level model on the target model can be reduced, and the feature weight values corresponding to the current level can be accurately calculated, which can improve the accuracy of the feature weight values calculated.

As can be seen, after obtaining the trained target model, the first system can promptly push the trained target model to the second system, thereby improving maintenance synchronization and flexibility of the system.

Figure 5:
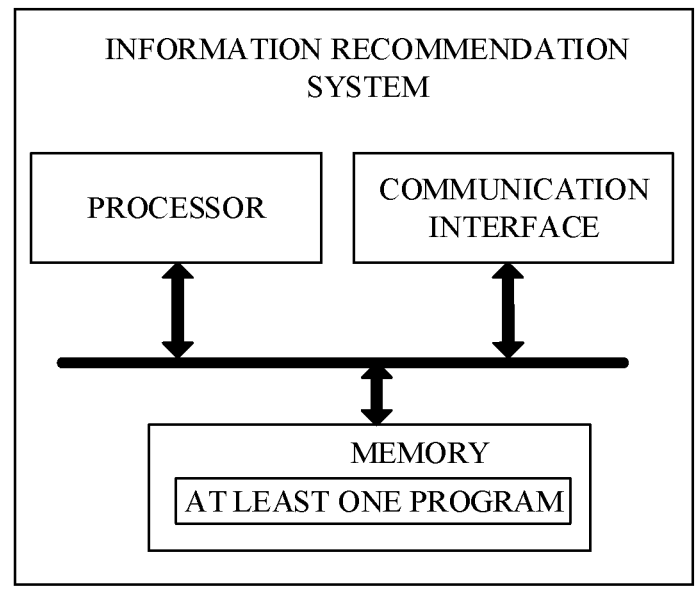
FIG. 5 is a schematic structural diagram illustrating an information recommendation system according to an implementation of the present disclosure.

Consistent with the implementations illustrated in FIG. 2 to FIG. 4, FIG. 5 is a schematic structural diagram illustrating an information recommendation system according to an implementation of the present disclosure. The information recommendation system has at least one application running thereon and an operating system. As illustrated in FIG. 5, the information recommendation system includes a processor, a memory, a communication interface, and at least one program. The at least one program is different from the foregoing at least one application. The at least one program is stored in the memory and configured to be executed by the processor. The at least one program includes instructions operable to perform the following operations.

Multiple types of features of the target model are obtained.

A feature group sequence of the multiple types of features is generated. The feature group sequence includes multiple feature groups and a sequence relation between the multiple feature groups. Each feature group contains at least one type of features among the multiple types of features.

The target model is classified into a multi-level model according to the feature group sequence. Feature weight values corresponding to each level of the multi-level model match with features in a feature group at a corresponding position of the feature group sequence.

A trained target model is obtained by executing a preset training operation on the feature weight values corresponding to each level of the multi-level model. One or more levels of the trained target model are configured to estimate a recommendation result of a target recommendation task.

According to the implementations of the disclosure, the information recommendation system obtains the multiple types of features of the target model and generates the feature group sequence of the multiple types of features. The information recommendation system classifies the target model into the multi-level model according to the feature group sequence. Thereafter, the information recommendation system obtains the trained target model by executing the preset training operation on the feature weight values corresponding to each level of the multi-level model, where one or more levels of the trained target model are configured to estimate the recommendation result of the target recommendation task. The feature group sequence includes the multiple feature groups and the sequence relation between the multiple feature groups, each feature group contains at least one type of features among the multiple types of features, and feature weight values corresponding to each level of the multi-level model match with features in a feature group at a corresponding position of the feature group sequence, so that the target model can adapt a corresponding model level according to features of a recommendation task with missing features when executing the recommendation task, and the model level adapted can be used to execute the recommendation task to obtain a more accurate recommendation result, thus reducing a deviation of the recommendation result of the recommendation task caused by the missing features, which can be beneficial to improve comprehensiveness and accuracy of the target model executing the recommendation task.

In one implementation, in terms of generating the feature group sequence of the multiple types of features, the instructions are operable to carry out the following: determining stability of each type of features of the multiple types of features; generating the feature group sequence according to the stability of each type of features of the multiple types of features.

In one implementation, in terms of determining the stability of each type of features of the multiple types of features, the instructions are operable to carry out the following: obtaining a first feature weight value of each type of features by training the target model via first sample data; obtaining a second feature weight value of each type of features by training the target model via second sample data; determining a difference in feature weight values of each type of features according to the first feature weight value and the second feature weight value; determining a ratio of sample data with partially missing features, from among the first sample data and the second sample data; determining the stability of each type of features according to the ratio and the difference.

In one implementation, the preset training operation includes the following: keeping feature weight values corresponding to levels other than a current level in the multi-level model unchanged; training feature weight values corresponding to the current level according to preset sample data.

In one implementation, the at least one program further includes instructions operable to execute the target recommendation task, after obtaining the trained target model by executing the preset training operation on the feature weight values corresponding to each level of the multi-level model.

Figure 6:
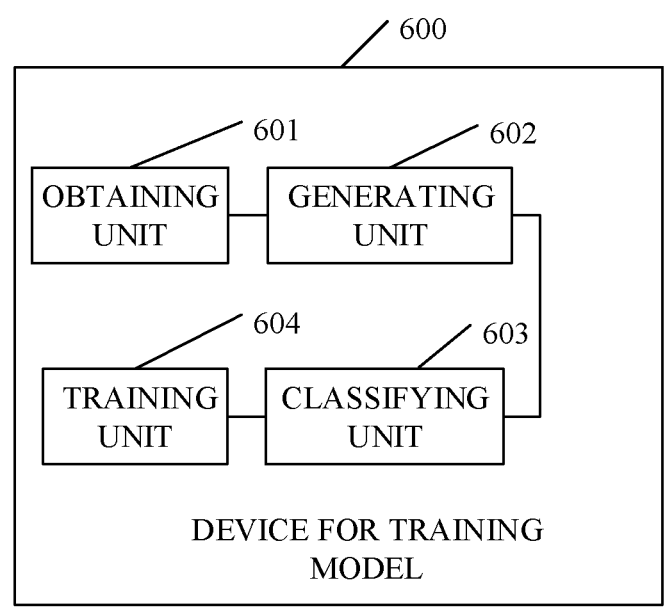
FIG. 6 is a block diagram illustrating functional units of a device for training a model according to an implementation of the disclosure.

FIG. 6 is a block diagram illustrating functional units of a device for training a model. The first system 600 is applicable to an information recommendation system. The first system includes a target model. The first system 600 includes an obtaining unit 601, a generating unit 602, a classifying unit 603, and a training unit 604.

The obtaining unit 601 is configured to obtain multiple types of features of the target model.

The generating unit 602 is configured to generate a feature group sequence of the multiple types of features. The feature group sequence includes multiple feature groups and a sequence relation between the multiple feature groups. Each feature group contains at least one type of features among the multiple types of features.

The classifying unit 603 is configured to classify the target model into a multi-level model according to the feature group sequence, where feature weight values corresponding to each level of the multi-level model match with features in a feature group at a corresponding position of the feature group sequence.

The training unit 604 is configured to obtain a trained target model by executing a preset training operation on the feature weight values corresponding to each level of the multi-level model, where one or more levels of the trained target model are configured to estimate a recommendation result of a target recommendation task.

According to the implementations of the disclosure, the first system obtains the multiple types of features of the target model and generates the feature group sequence of the multiple types of features. The first system classifies the target model into the multi-level model according to the feature group sequence. Thereafter, the first system obtains the trained target model by executing the preset training operation on the feature weight values corresponding to each level of the multi-level model, where one or more levels of the trained target model are configured to estimate the recommendation result of the target recommendation task. The feature group sequence includes the multiple feature groups and the sequence relation between the multiple feature groups, each feature group contains at least one type of features among the multiple types of features, and feature weight values corresponding to each level of the multi-level model match with features in a feature group at a corresponding position of the feature group sequence, so that the target model can adapt a corresponding model level according to features of a recommendation task with missing features when executing the recommendation task, and the model level adapted can be used to execute the recommendation task to obtain a more accurate recommendation result, thus reducing a deviation of the recommendation result of the recommendation task caused by the missing features, which can be beneficial to improve comprehensiveness and accuracy of the target model executing the recommendation task.

In one implementation, the generating unit 602 configured to generate the feature group sequence of the multiple types of features is configured to: determine stability of each type of features of the multiple types of features; generate the feature group sequence according to the stability of each type of features of the multiple types of features.

In one implementation, the generating unit 602 configured to determine the stability of each type of features of the multiple types of features is configured to: obtain a first feature weight value of each type of features by training the target model via first sample data; obtain a second feature weight value of each type of features by training the target model via second sample data; determine a difference in feature weight values of each type of features according to the first feature weight value and the second feature weight value; determine a ratio of sample data with partially missing features, from among the first sample data and the second sample data; determine the stability of each type of features of the multiple types of features according to the ratio and the difference.

In one implementation of the disclosure, the preset training operation includes the following. Feature weight values corresponding to levels other than a current level in the multi-level model are kept unchanged. Feature weight values corresponding to the current level are trained according to preset sample data.

In one implementation, the information recommendation system further includes an second system. The first system further includes a sending unit. The sending unit is configured to send the trained target model to the second system, where the trained target model is configured for the second system to execute the target recommendation task after the training unit 604 obtains the trained target model by executing the preset training operation on the feature weight values corresponding to each level of the multi-level model.

It is to be noted that, the first system described in the apparatus implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

The generating unit 602 and the classifying unit 603 may be a processor or a controller. The obtaining unit 601 may be a communication interface.

Implementations of the present disclosure also provide a non-transitory computer storage medium. The non-transitory computer storage medium is configured to store computer programs for electronic data interchange which, when executed, are operable with a computer to execute all or part of the operations of any of the methods described in the above-described method implementations. The computer may include a mobile terminal.

Implementations of the present disclosure also provide a computer program product. The computer program product includes a non-transitory computer-readable storage medium that stores computer programs. The computer programs are operable with a computer to perform all or part of the operations of any of the methods described in the above method implementations. The computer program product may be a software installation package and the computer may include a mobile terminal.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the first system disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It should be noted that those of ordinary skill in the art may understand that all or part of the steps in the methods described in the foregoing implementations may be implemented by a program instructing relevant hardware. The program may be stored in a computer-readable storage medium, such as stored in a memory. The memory may include a read only memory (ROM), a random access memory (RAM), a magnetic disk, an optical disk, or the like.

It will be understood by those of ordinary skill in the art that all or a part of the various methods of the implementations described above may be accomplished by means of a program to instruct associated hardware, the program may be stored in a computer readable memory, which may include a flash memory, a read-only memory (ROM), a random-access memory (RAM), Disk or compact disc (CD), and so on.

What is claimed is:

1. A method for training a model, being applicable to an information recommendation system comprising a target model, the method comprising:
   obtaining a plurality of types of features of the target model;
   generating a feature group sequence of the plurality of types of features, the feature group sequence comprising a plurality of feature groups and a sequence relation between the plurality of feature groups, each feature group containing at least one type of features among the plurality of types of features;
   classifying the target model into a multi-level model according to the feature group sequence, wherein feature weight values corresponding to each level of a multi-level model match with features in a feature group at a corresponding position of the feature group sequence; and
   obtaining a trained target model by executing a preset training operation on the feature weight values corresponding to each level of the multi-level model, one or more levels of the trained target model being configured to estimate a recommendation result of a target recommendation task; wherein
   generating the feature group sequence of the plurality of types of features comprises:
   determining stability of each type of features of the plurality of types of features; and
   generating the feature group sequence according to the stability of each type of features of the plurality of types of features.

2. The method of claim 1, wherein the target model is configured to execute a recommendation task for items to be recommended, and types of features of the target model comprise at least one of: features of attribute of the items to be recommended, features of a target user, and features of a scenario in which the target user is located.

3. The method of claim 1, wherein determining the stability of each type of features of the plurality of types of features comprises:
   obtaining a first feature weight value of each type of features by training the target model via first sample data;
   obtaining a second feature weight value of each type of features by training the target model via second sample data;
   determining a difference in feature weight values of each type of features according to the first feature weight value and the second feature weight value;
   determining a ratio of sample data with partially missing features, from among the first sample data and the second sample data; and
   determining the stability of each type of features according to the ratio and the difference.

4. The method of claim 1, wherein the feature weight values corresponding to each level of the multi-level model match with features in a feature group at a corresponding position of the feature group sequence when feature groups in the feature group sequence are sorted in a descending order of stability.

5. The method of claim 1, wherein the preset training operation comprises:
keeping feature weight values corresponding to levels other than a current level in the multi-level model unchanged; and
training feature weight values corresponding to the current level according to preset sample data.

6. The method of claim 1, wherein the method further comprises:
after obtaining the trained target model by executing the preset training operation on the feature weight values corresponding to each level of the multi-level model, executing the target recommendation task.

7. A system for information recommendation, comprising:
a processor; and
a memory configured to store executable program codes which, when executed, cause the processor to:
obtain a plurality of types of features of a target model;
generate a feature group sequence of the plurality of types of features, the feature group sequence comprising a plurality of feature groups and a sequence relation between the plurality of feature groups, each feature group containing at least one type of features among the plurality of types of features;
classify the target model into a multi-level model according to the feature group sequence, wherein feature weight values corresponding to each level of a multi-level model match with features in a feature group at a corresponding position of the feature group sequence; and
obtain a trained target model by executing a preset training operation on the feature weight values corresponding to each level of the multi-level model, one or more levels of the trained target model being configured to estimate a recommendation result of a target recommendation task; wherein
the executable program codes causing the processor to generate the feature group sequence of the plurality of types of features cause the processor to:
determine stability of each type of features of the plurality of types of features; and
generate the feature group sequence according to the stability of each type of features of the plurality of types of features.

8. The system of claim 7, wherein the target model is configured to execute a recommendation task for items to be recommended, and types of features of the target model comprise at least one of: features of attribute of the items to be recommended, features of a target user, and features of a scenario in which the target user is located.

9. The system of claim 7, wherein the executable program codes causing the processor to determine the stability of each type of features of the plurality of types of features cause the processor to:
obtain a first feature weight value of each type of features by training the target model via first sample data;
obtain a second feature weight value of each type of features by training the target model via second sample data;
determine a difference in feature weight values of each type of features according to the first feature weight value and the second feature weight value;
determine a ratio of sample data with partially missing features, from among the first sample data and the second sample data; and
determine the stability of each type of features according to the ratio and the difference.

10. The system of claim 7, wherein the preset training operation comprises:
keeping feature weight values corresponding to levels other than a current level in the multi-level model unchanged; and
training feature weight values corresponding to the current level according to preset sample data.

11. The system of claim 7, wherein the executable program codes further cause the processor to:
execute the target recommendation task.

12. The system of claim 7, wherein the feature weight values corresponding to each level of the multi-level model match with features in a feature group at a corresponding position of the feature group sequence when feature groups in the feature group sequence are sorted in a descending order of stability.

13. A method for training a model, being applicable to an information recommendation system comprising a first system, the first system comprising a target model, the method comprising:
obtaining, by the first system, a plurality of types of features of the target model;
generating, by the first system, a feature group sequence of the plurality of types of features, the feature group sequence comprising a plurality of feature groups and a sequence relation between the plurality of feature groups, each feature group containing at least one type of features among the plurality of types of features;
classifying, by the first system, the target model into a multi-level model according to the feature group sequence, wherein feature weight values corresponding to each level of a multi-level model match with features in a feature group at a corresponding position of the feature group sequence; and
obtaining, by the first system, a trained target model by executing a preset training operation on the feature weight values corresponding to each level of the multi-level model, one or more levels of the trained target model being configured to estimate a recommendation result of a target recommendation task; wherein
generating, by the first system, the feature group sequence of the plurality of types of features comprises:
determining, by the first system, stability of each type of features of the plurality of types of features; and
generating, by the first system, the feature group sequence according to the stability of each type of features of the plurality of types of features.

14. The method of claim 13, wherein determining, by the first system, the stability of each type of features of the plurality of types of features comprises:
obtaining, by the first system, a first feature weight value of each type of features by training the target model via first sample data;
obtaining, by the first system, a second feature weight value of each type of features by training the target model via second sample data;
determining, by the first system, a difference in feature weight values of each type of features according to the first feature weight value and the second feature weight value;

determining, by the first system, a ratio of sample data with partially missing features, from among the first sample data and the second sample data; and determining, by the first system, the stability of each type of features according to the ratio and the difference.

15. The method of claim 13, wherein the preset training operation comprises:

keeping feature weight values corresponding to levels other than a current level in the multi-level model unchanged; and training feature weight values corresponding to the current level according to preset sample data.

16. The method of claim 13, the information recommendation system further comprising a second system, wherein the method further comprises:

after the obtaining, by the first system, the trained target model by executing the preset training operation on the feature weight values corresponding to each level of the multi-level model, sending, by the first system, the trained target model to the second system; the trained target model being configured for the second system to execute the target recommendation task, and the target recommendation task being a recommendation task for one or more target items to be recommended.

17. The method of claim 13, wherein the feature weight values corresponding to each level of the multi-level model match with features in a feature group at a corresponding position of the feature group sequence when feature groups in the feature group sequence are sorted in a descending order of stability.

* * * * *